Jan. 1, 1935.                H. T. SHARP                1,986,371
                          DENTAL FLOSS HOLDER
                         Filed March 20, 1934           2 Sheets-Sheet 2
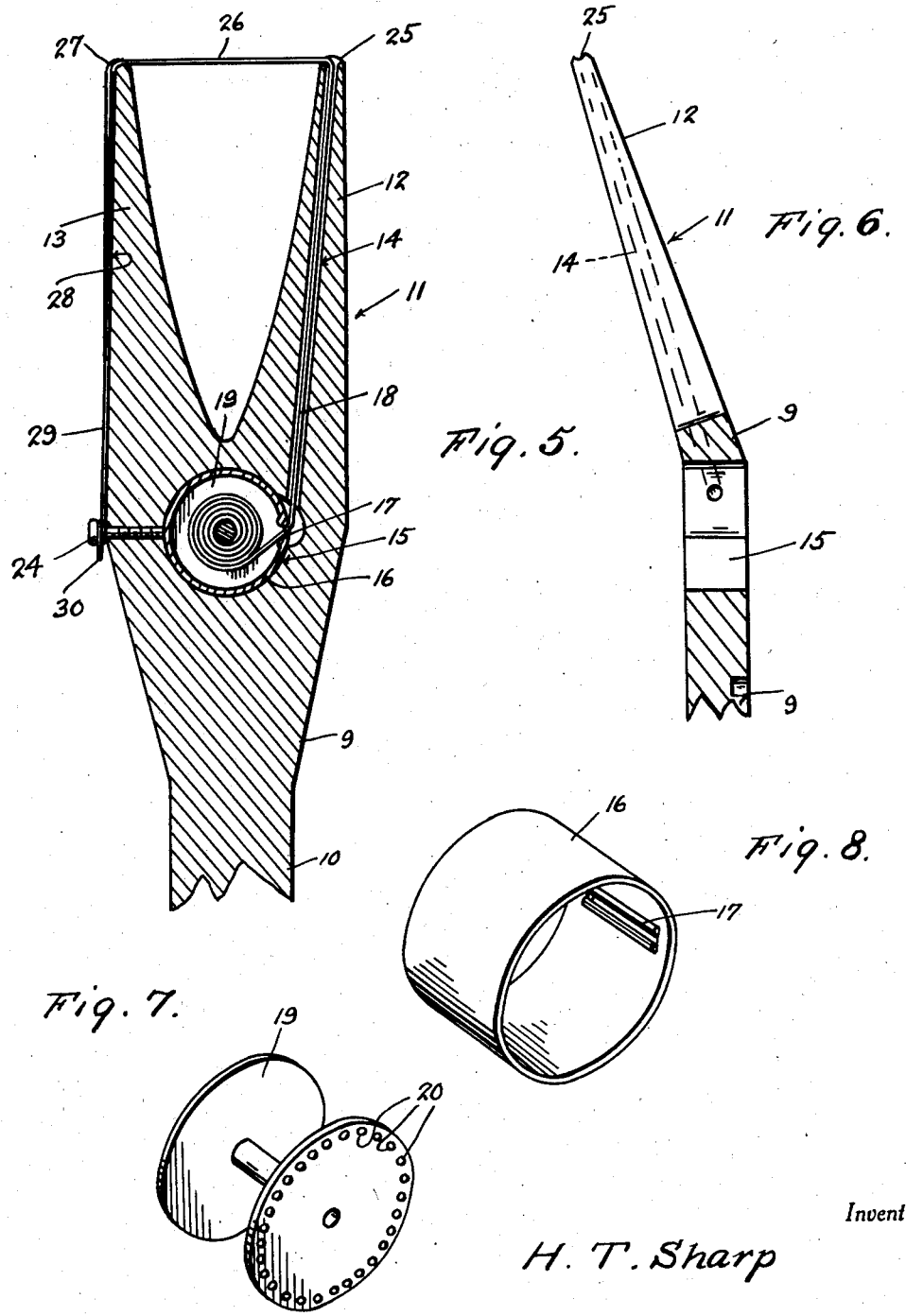
Inventor
H. T. Sharp
By Clarence A. O'Brien
                    Attorney Patented Jan. 1, 1935

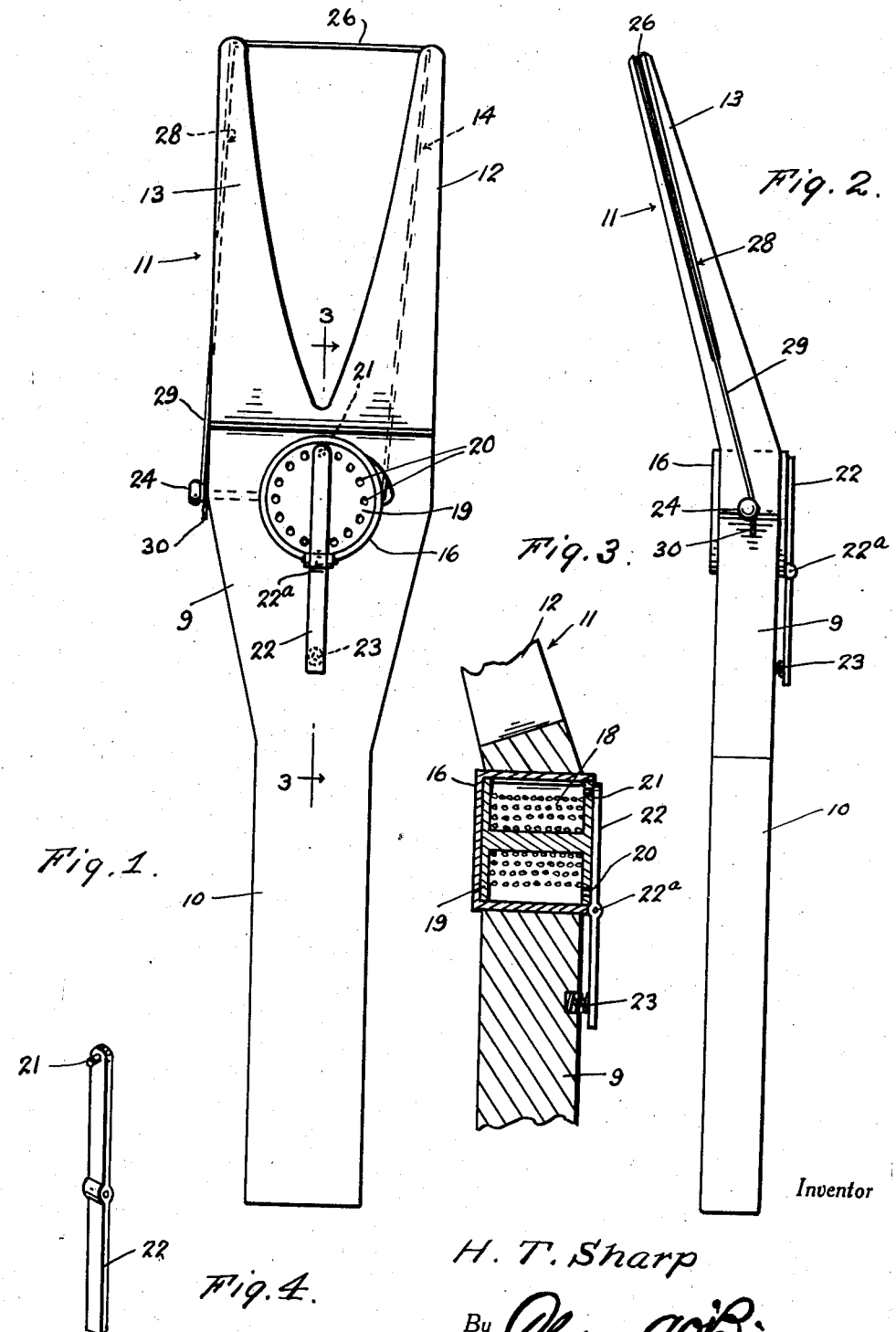

1,986,371

UNITED STATES PATENT OFFICE 1,986,371

DENTAL FLOSS HOLDER

Henry Thomas Sharp, Chicago, Ill.

Application March 20, 1934, Serial No. 716,535

4 Claims. (Cl. 132—92)

This invention relates to an improved dental floss holder in the nature of a hand actuated implement or tool wherein the dental floss is so arranged and held as to facilitate cleaning the interstices between the teeth.

Briefly stated, the preferred embodiment of the invention comprises a body or stock formed at one end with a convenient handle and at the opposite end with a laterally offset fork between whose prongs one stretch of the dental floss is tautly bowed, whereby to permit this limited stretch or portion of the floss to be conveniently inserted and manipulated in the interstices or inter-dental spaces.

It is admittedly old in this particular line of endeavor to provide various forms and styles of dental floss holders. Therefore, it is my primary aim to generally improve upon known types by providing a structure characterized by simplicity and other structural refinements, such as appear to be more aptly fitted for the purposes intended and to otherwise better fulfill the requirements of an implement of this kind.

Other features and advantages will become more readily apparent from the following description and drawings.

In the drawings:—

Figure 1 is an elevational view showing the preferred embodiment of the invention and the selection and association of structural features, the device being made ready for use.

Figure 2 is an edge elevation of Figure 1, observing it in a direction from left to right.

Figure 3 is an enlarged detail sectional view taken approximately on the plane of the line 3—3 of Figure 1.

Figure 4 is a perspective detail view.

Figure 5 is a fragmentary sectional and elevational view illustrating the method of threading the dental floss for adjustable usage.

Figure 6 is a view somewhat similar to Figure 3, with the dental floss spool and associated appurtenances removed.

Figures 7 and 8 are perspective views of the spool and its cup-like casing, respectively.

The body portion of the stock, which may be of any appropriate material, is denoted by the numeral 9 and may be of suitable shape and proportions. At one end it is formed with an extension which defines a handle 10. The opposite end portion is fashioned to provide a laterally offset fork 11. The arms of the fork are differentiated by the numerals 12 and 13, respectively. The arm 12 is provided with a guide bore 14 which is in communication with an adapter hole 15 formed in the body to accommodate the dental floss and its associated parts.

As shown in Figure 8, one of the parts comprises a cup-like casing 16 having a feed slot 17 through which the dental floss 18 passes. The dental floss is wound on a spool 19 which, as shown in Figure 7, has one of its heads formed around its marginal portion with sockets 20 which serve as keeper holes. These holes are adapted to accommodate a keeper pin or stub 21 formed on one end of a latch lever 22. The lever is pivotally mounted intermediate its ends, as indicated at 23 on the casing and located between the depressible end of the lever and the handle is an expansion spring 23 which serves to seat the keeper pin 21 in the keeper holes or sockets 20. The dental floss unit, embodying the parts 16 and 19, is held in the adapter hole 15 through the instrumentality of a set screw 24, as shown in Figure 5. The dental floss is unwound from the reel or spool and threaded up through the guide bore 14 and then trained laterally through a kerf 25 formed in the extremity of the fork arm 12. The dental floss is then carried across the space between the extremities of the fork arms or prongs 12 and 13, as indicated at 26 in Figure 5, and is then trained downwardly through and over a retaining kerf 27 formed in the extremity of the fork arm 13. This fork arm 13 is further formed with a retention or guide groove 28 and the free end portion 29 of the floss is drawn down through this kerf and tied around the head of the set screw, as indicated at 30. As the dental floss is used, a new stretch 26 is brought into position and the surplus at the free end portion 30 is cut off, if desired.

The dental floss unit or cartridge, as it is sometimes called, is to be purchased as a separate unit on the market and inserted into the adapter hole 15 where it is held in place by the set screw 24, as is obvious. The spring pressed latch 22 serves to prevent rotation of the spool and consequent unwinding of the floss. The arm portions 12 and 13 of the fork are preferably of yieldable form and are pressed slightly together between the fingers as the portion 26 of the floss is stretched tautly between the kerfs 25 and 27. Then as the floss stretches during the reciprocatory operation of the portion 26 between the teeth, the arms 13 and 12 expand or separate, keeping said portion 26 taut.

Novelty is thought to reside in the one-piece body or stock including a body portion 9 appropriately fashioned and apertured, as at 15, to adapt said aperture to accommodate the dental floss cartridge or unit, wherein said body is formed at one end with a handle 10 and at the opposite end with a resilient fork 11 between whose arms the operating portion of the floss is tautly bowed or stretched. Additional novelty is predicated on the offset fork, that is, laterally offset with respect to the handle 10 to facilitate efficient usage, together with the bore 14 and the grooved arm 13 and the cooperating notches or kerfs 25 and 26 and the double usage of the set screw 24 to serve as a retaining element for the cartridge, as well as an anchoring element for the extremity of the floss.

It is thought that the description, taken in connection with the drawings, will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:—

1. As a new article of manufacture, a dental floss cartridge for use in association with a holder of the type described comprising a cup-like casing, a floss containing spool mounted for rotation in said casing, one head of the spool being formed with keeper holes, a latch pivotally mounted intermediate its ends on the rim of the casing, and a keeper stud carried by the free end portion of the latch and selectively engageable with said keeper holes.

2. A structure of the class described comprising an implement including a body formed with an adapter hole, a handle and a fork, said fork having guide means for the dental floss, a floss unit comprising a casing fitted into said adapter hole, a spool mounted for rotation in said casing, the rim of the casing having an outlet slot for the dental floss, and a set screw carried by said body and engageable with said casing to maintain the latter in place.

3. A structure of the class described comprising a body formed with an adapter opening, a handle carried by said body, and a fork formed integral with the body, one of said fork arms being provided with a longitudinal bore in communication with said opening, the other fork arm being formed with a dental floss retention groove, a casing removably mounted in said adapter opening, a dental floss spool mounted for rotation in said casing, the casing having a guide slot in communication with said bore, and a set screw carried by said body and engageable with the casing to hold the casing in place, together with adjustable retaining means for said spool.

4. A dental floss holder of the class described comprising a body having a fork at one end and a handle at the opposite end, that portion of the body between the handle and fork being provided with an adapter hole, one of the fork arms being provided with a longitudinal bore in communication with said hole, the other fork arm being formed with a dental floss retention groove, a renewable dental floss cartridge removably mounted in said adapter hole, and a set screw carried by said body having its inner end projecting into said hole to hold the cartridge in place, the headed end of said set screw being located adjacent the inner end of the aforesaid groove in order to accommodate the free end portion of the dental floss.

HENRY THOMAS SHARP.